United States Patent [19]

Sano

[11] Patent Number: 5,407,968
[45] Date of Patent: Apr. 18, 1995

[54] POLYETHER POLYOLS, WATER-CURABLE POLYURETHANE PREPOLYMERS BASED THEREON, AND COMPOSITIONS CONTAINING THE PREPOLYMERS

[75] Inventor: Takashi Sano, Shiga, Japan

[73] Assignee: Dai-Ichi Kogyo Seiyaku Co., Ltd., Kyoto, Japan

[21] Appl. No.: 532

[22] Filed: Jan. 4, 1993

Related U.S. Application Data

[63] Continuation of Ser. No. 463,684, Jan. 11, 1990, abandoned.

[30] Foreign Application Priority Data

Jan. 19, 1989 [JP] Japan ................................ 1-10793

[51] Int. Cl.⁶ .............................................. C08G 18/10
[52] U.S. Cl. ..................................... 521/159; 521/914; 528/76; 528/77; 528/78; 252/182.27; 252/182.2; 252/182.21; 252/182.22; 560/158; 568/624
[58] Field of Search ................... 521/914, 159; 528/76, 528/77, 78; 252/182.27, 182.2, 182.21, 182.22; 568/624; 560/158

[56] References Cited

U.S. PATENT DOCUMENTS

| 4,082,703 | 4/1978 | Duffy et al. ........................... 528/76 |
| 4,312,973 | 1/1982 | Critchfield et al. ................... 528/75 |

FOREIGN PATENT DOCUMENTS

| 48-25205 | 7/1973 | Japan . |
| 53-19846 | 6/1978 | Japan . |
| 54-15080 | 6/1979 | Japan . |
| 1428737 | 3/1976 | United Kingdom ................ 521/914 |

*Primary Examiner*—John Kight, III
*Assistant Examiner*—R. F. Johnson
*Attorney, Agent, or Firm*—Jordan and Hamburg

[57] ABSTRACT

The invention relates to a polyether polyol, a water-curable polyurethane prepolymer prepared by using the polyether polyol, and a composition containing the prepolymer. The above polyether polyol is obtainable by subjecting an active hydrogen compound to addition polymerization reaction with ethylene oxide and an alkylene oxide of 3 to 4 carbon atoms in a specified ratio. The above water-curable polyurethane prepolymer is obtainable by reacting the polyether polyol with a polyisocyanate compound. The above composition comprises a mixture of the water-curable polyurethane prepolymer and the polyisocyanate. The above water-curable polyurethane prepolymer and composition provide a foam of fine and uniform cell structure with improved strength on curing with water.

4 Claims, No Drawings

POLYETHER POLYOLS, WATER-CURABLE POLYURETHANE PREPOLYMERS BASED THEREON, AND COMPOSITIONS CONTAINING THE PREPOLYMERS

This application is a continuation of application Ser. No. 07/463,684, filed Jan. 11, 1990, now abandoned.

BACKGROUND OF THE INVENTION

The present invention relates to a polyether polyol, a water-curable polyurethane prepolymer obtainable by reacting said polyether polyol with a polyisocyanate compound, and a composition containing such a prepolymer.

Among the hitherto-available polyether polyols for the production of hydrophilic polyurethane resin are polyols which are obtainable by either serial addition or random addition polymerization of propylene oxide and ethylene oxide. For example, Japanese Patent Publication No. 54-15080 describes a process for producing a hydrophilic polyurethane resin using a polyether polyol obtainable by random addition polymerization of ethylene oxide and propylene oxide.

Among the known water-curable polyurethane prepolymers are the prepolymer obtainable by reacting polyethylene glycol with an organic isocyanate as disclosed in Japanese Patent Publication No. 48-25205 and the prepolymer obtainable by reacting a polyol synthesized by random addition polymerization of an alkylene oxide mixture containing not less than 50 weight % of ethylene oxide or a polyol synthesized by serial addition polymerization of propylene oxide and ethylene oxide with an organic isocyanate as described in Japanese Patent Publication No. 53-19846.

However, the prepolymer synthesized using polyethylene glycol is a solid due to the crystallinity of polyethylene glycol. To make it into a liquid which can be easily used, a solvent or the like must be added but this procedure presents a problem in regard to labor hygiene and a risk of ignition.

The same problem and risk exist with the polyether polyol synthesized by serial addition of propylene oxide and ethylene oxide, for this polyol, too, contains the polyethylene glycol chain.

The polyol synthesized by random addition polymerization of ethylene oxide and propylene oxide is relatively low in viscosity and low in crystallinity, thus being less liable to give a solid. However, since most of its terminal OH groups are secondary hydroxy groups, this polyol is low in reactivity and this not only means a prolonged urethanation time required but, when the polyol is reacted with tolylene diisocyanate (hereinafter referred to as TDI) to prepare a prepolymer, it tends to leave a large amount of TDI unreacted, thus detracting from labor hygiene.

SUMMARY OF THE INVENTION

It is an object of the present invention to provide a polyether polyol which is very hydrophilic, is primary hydroxy-terminated and, hence, high in reactivity, and when reacted with TDI, gives a prepolymer with a low free TDI content.

It is another object of the invention to provide a water-curable prepolymer which gives a polyurethane resin with high mechanical strength and a water-curable composition containing the same.

The polyether polyol according to the invention is a polyol prepared by random addition polymerization reaction of an active hydrogen compound containing 2 to 3 active hydrogen atoms with, based on each active hydrogen thereof, l equivalents of ethylene oxide and m equivalents of an alkylene oxide of 3 to 4 carbon atoms and subsequent addition polymerization of p equivalents of ethylene oxide, where l, m and p satisfy the relationship defined by the following equation (1).

$$\frac{(l + p) \times 44}{(l + P) \times 44 + M \times m} = 0.5 \text{ to } 0.9 \tag{1}$$

where l and m each is a positive value, p is a value not less than 5, and M is the molecular weight of the alkylene oxide of 3 to 4 carbon atoms.

The water-curable polyurethane prepolymer of the invention is a prepolymer obtainable by reacting the above polyether polyol with an excess of a polyisocyanate compound containing at least two isocyanato groups within its molecule.

The composition of the invention comprises a mixture of the water-curable polyurethane prepolymer and a polyisocyanate compound.

DESCRIPTION OF THE PREFERRED EMBODIMENTS

The polyether polyol of the present invention is preferably a polyol having 2 to 3 hydroxy groups. When the number of hydroxy groups is less than 2, it does not give a prepolymer which will cure on reaction with water. On the other hand, when the number of hydroxy groups is more than 3, it does not give a stable prepolymer but tends to gel and harden during reaction or storage.

As an example of such preferred polyether polyol, there may be mentioned a polyol obtainable by adding alkylene oxide to an active hydrogen compound having 2 to 3 active hydrogen atoms.

Among the active hydrogen compounds containing two active hydrogen atoms are those compounds having two OH groups such as ethylene glycol, propylene glycol, 1,3-propanediol, 1,4-butanediol, 1,3-butanediol, 1,6-hexanediol, bisphenol A, hydroquinone, etc. and the compounds having two amino active hydrogen atoms such as aniline, methylamine and so on. There can also be employed compounds obtainable by addition reaction of 1 to 2 moles of ethylene oxide to aniline or methylamine.

Among the compounds containing three active hydrogen atoms are glycerol, trimethylolpropane, ammonia, triethanolamine, diethanolamine, monoethanolamine, triisopropanolamine and so on.

In accordance with the present invention, alkylene oxide is added to the active hydrogen compound in two portions. The alkylene oxide to be first added is a mixture of ethylene oxide, which is an essential component, with at least one alkylene oxide of 3 to 4 carbon atoms. The alkylene oxide of 3 to 4 carbon atoms includes propylene oxide, 1,2-butylene oxide and 2,3-butylene oxide. The proportion of ethylene oxide in this alkylene oxide is preferably 30 to 85 weight %, although this range is not critical. The mode of addition thereof is random addition. The alkylene oxide to be next added is intended to convert the terminal hydroxy groups of the polyether polyol to primary hydroxy groups, and is ethylene oxide.

The total proportion of alkylene oxide to be added in these two stages should be sufficient to assure that ethylene oxide accounts for 50 to 90 weight % per active hydrogen atom of the active hydrogen compound. In other words, l, m and p should satisfy the equation (1) as mentioned hereinabove. The left term of equation (1) represents the proportion of ethylene oxide component in the alkylene oxide chain of the polyether polyol according to the invention and, as defined by this equation, the ethylene oxide component must account for 50 to 90 weight % of the alkylene oxide chain:

$$\frac{(l + p) \times 44}{(l + p) \times 44 + M \times m} = 0.5\text{--}0.9 \quad (1)$$

When the proportion of ethylene oxide is less than 50 weight %, the prepolymer obtainable by reaction of this polyether polyol with a polyisocyanate compound will not be sufficiently compatible with water. Conversely, when the ethylene oxide content exceeds 90 weight %, the melting point of the polyether polyol is too high and, hence, that of the resulting prepolymer obtainable on reaction with a polyisocyanate compound is also too high to be easily processable.

Therefore, l and m should be positive values, p be a value not less than 5, and ethylene oxide account for 50 to 90 weight % of the alkylene oxide chain. Moreover, the number of moles of the ethylene oxide to be added to the termini of the polyether polyol, that is to say p, should be not less than 5 moles, and preferably 5 to 20 moles, per active hydrogen atom. When the number of moles of ethylene oxide is less than 5, the rate of conversion of terminal OH groups to primary hydroxy groups is too low to assure a sufficiently useful product. Conversely when the number of moles exceeds 20, the resulting polyethylene glycol chain tends to increase .the melting point and viscosity of the polyether polyol.

The average molecular weight of the alkylene oxide chain in the polyether polyol according to the invention is preferably in the range of 500 to 3000 per active hydrogen atom.

The polyether polyol of the invention can be produced as follows. Thus, an active hydrogen compound containing 2 to 3 active hydrogen atoms is subjected first to random addition reaction with a mixture of ethylene oxide with at least one member selected from the group consisting of propylene oxide, 1,2-butylene oxide and 2,3-butylene oxide in the presence of a basic catalyst at a temperature of 80° to 140° C. and a pressure of 0 to 5 kg/cm² and then to addition reaction with ethylene oxide at a temperature of 80°–140° C. and a pressure of 0 to 5 kg/cm². The basic catalyst is then neutralized and removed by the per se known procedure.

Examples of the basic catalyst are potassium hydroxide, sodium hydroxide, potassium metal, sodium metal, potassium methoxide, sodium methoxide, potassium ethoxide and sodium ethoxide.

The basic catalyst is added in an amount corresponding to 0.1 to 1.0 weight % of the polyether polyol obtainable by the addition reaction.

The resulting polyether polyol of the invention may for example be one represented by the following general formula (2):

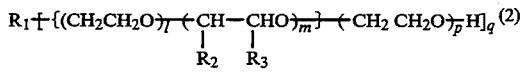

wherein $R_1$ is the residue of an active hydrogen compound containing 2 to 3 active hydrogen atoms; $R_2$ and $R_3$ each is a hydrogen atom, a methyl group or an ethyl group; provided, however, that both $R_2$ and $R_3$ are not concurrently hydrogen atoms;

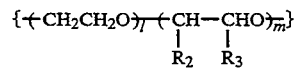

is a random polymer chain; l and m each is a positive value, p is a value not less than 5, q is a value equal to 2 through 3, and the relationship of p, l and m satisfies the following equation (1):

$$\frac{(l + p) \times 44}{(l + p) \times 44 + M \times m} = 0.5\text{--}0.9 \quad (1)$$

wherein M is the molecular weight of

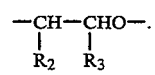

The polyisocyanate compound to be reacted with the polyether polyol of the invention includes compounds having at least two isocyanato groups such as, for example, tolylene diisocyanate (TDI), diphenylmethane diisocyanate (MDI), crude diphenylmethane diisocyanate (cr-MDI), xylylene diisocyanate, hexamethylene diisocyanate, isophorone diisocyanate, hydrogenated MDI and so on. Among these polyisocyanate compounds, TDI, MDI and cr-MDI are particularly useful in terms of reaction rate, strength of the cured product, and so forth. These polyisocyanate compounds can be used alone or in combination. Particularly, the prepolymer obtainable with TDI is low in viscosity and easily dispersible in water. Where it is desirable to increase the NCO content of the prepolymer, MDI or cr-MDI may be added to the prepolymer prepared with TDI. The resulting prepolymer will then be improved in compatibility and stability.

The water-curable polyurethane prepolymer of the invention can be synthesized by reacting the above polyether polyol of the invention with said polyisocyanate compound in an appropriate ratio at a temperature of 80° to 130° C. for 1 to 5 hours. The reaction ratio of polyether polyol to polyisocyanate is preferably a value such that the free NCO content of the resulting water-curable polyurethane prepolymer will be 1.5 to 15 weight %.

The water-curable polyurethane prepolymer composition of the invention can be produced by blending a polyisocyanate compound with the resulting water-curable polyurethane prepolymer in an appropriate ratio. This blending ratio is preferably a value-such that the free NCO content of the water-curable polyurethane prepolymer composition will be in the range of 2 to 16 weight % of the total composition.

The terminal OH groups of the polyether polyol according to the invention are primary hydroxy groups and even when its molecular weight is high, this polyol reacts with a polyisocyanate compound efficiently and fast even at a relatively low temperature. Therefore, assuming that a polyurethane prepolymer is prepared using TDI, the free TDI content of the resulting polyurethane prepolymer will be low enough to cause no problem in labor hygiene. Furthermore, this polyol is a liquid which is comparatively low in viscosity and good in workability.

Therefore, the water-curable polyurethane prepolymer derived from this polyether polyol is also comparatively low in viscosity, easily dispersible in water and improved in workability. Furthermore, when it is foamed and cured by mixing with water, the prepolymer provides a foam having a fine and uniform cellular structure and improved strength properties.

The water-curable polyurethane prepolymer composition comprising a mixture of the above prepolymer and a polyisocyanate compound is excellent in prepolymer stability and when mixed with water for curing and foaming, provides a foam having a fine and uniform cellular structure.

Therefore, the water-curable polyurethane prepolymer and composition according to the present invention are very useful in various applications such as water sealants, ground improving materials, adhesives for moist wood, and so on.

The following examples and comparative examples are intended to illustrate the invention in further detail and should by no means be construed as defining the metes and bounds of the invention.

It should be understood that, in the examples and comparative examples, all parts and % are by weight.

EXAMPLE 1

An autoclave was charged with 76 parts of propylene glycol and 13.5 parts of potassium hydroxide and the internal pressure was reduced to 7 mmHg at 120° C. Then, a mixture of 2643 parts of ethylene oxide and 881 parts of propylene oxide was bubbled into the charge at 120° C. in such a manner that the reaction pressure would not exceed 3 kg/cm$^2$. After the pressure fell to 0 kg/cm$^2$, 900 parts of ethylene oxide was bubbled at 120° C. so that the reaction pressure would not exceed 1 kg/cm$^2$. When the reaction pressure subsided to 0 kg/cm$^2$, the reaction product was withdrawn from the autoclave. To 4500 parts of this reaction product was added 4500 parts of water and the mixture was neutralized with an ion exchange resin and dehydrated.

The resulting polyether polyol had a hydroxy value of 25 mg KOH/g and a viscosity of 2300 cps at 25° C. The proportion of primary hydroxy groups among all the hydroxy groups as determined by NMR was 100%.

Furthermore, in this polyether polyol, $l=30$, $m=7.6$, $p=10.2$ and $q=2$, and the ethylene oxide content calculated by means of equation (1) was 0.8. The solidification point of this polyether polyol was 17° C.

EXAMPLE 2

An autoclave was charged with 92 parts of glycerol and 13.5 parts of potassium hydroxide and the internal pressure was reduced to 7 mmHg at 120° C. Then, a mixture of 2681 parts of ethylene oxide and 1227 parts of propylene oxide was bubbled at 120° C. so that the reaction pressure would not exceed 3 kg/cm$^2$. When the reaction pressure had subsided to 0 kg/cm$^2$, 1000 parts of ethylene oxide was bubbled at 130° C. so that the reaction pressure would not exceed 1 kg/cm$^2$. When the internal pressure registered 0 kg/cm$^2$, the reaction product was withdrawn from the autoclave. To 5000 parts of this reaction product was added 5000 parts of water and the mixture was neutralized with an ion exchange resin and dehydrated.

The resulting polyether polyol had a hydroxy value of 33.5 mg KOH/g and a viscosity of 1900 cps at 25° C. The proportion of primary hydroxy groups among all hydroxy groups as determined by NMR was 87%.

In this polyether polyol, $l=21.2$, $m=7.1$, $p=7.6$, $q=3$, and the ethylene oxide content calculated by means of equation (1) was 0.75. The solidification point of this polyether polyol was 8° C.

EXAMPLE 3

An autoclave was charged with 61.3 parts of glycerol and 15 parts of potassium hydroxide and the internal pressure was reduced to 7 mmHg at 120° C. Then, a mixture of 2637 parts of ethylene oxide and 1235 parts of propylene oxide was bubbled at 120° C. so that the reaction pressure would not exceed 4 kg/cm$^2$. When the pressure had subsided to 0 kg/cm$^2$, 1067 parts of ethylene oxide was bubbled at 130° C. in such a manner that the reaction pressure would not exceed 1 kg/cm$^2$. After the pressure became 0 kg/cm$^2$, the reaction product was withdrawn from the autoclave. To 5000 parts of the reaction product was added 5000 parts of water and the mixture was neutralized with an ion exchange resin and dehydrated.

The resulting polyether polyol had a hydroxy value of 22.5 mg KOH/g and a viscosity of 2800 cps at 25° C. The proportion of primary hydroxy groups among all the hydroxy groups as determined by NMR was 100%.

In this polyether polyol, $l=30.0$, $m=10.6$, $p=12.1$, $q=3$, and the ethylene oxide content calculated by means of equation (1) was 0.75. The solidification point of this polyether polyol was 11° C.

EXAMPLE 4

An autoclave was charged with 93 parts of aniline and, then, 88 parts of ethylene oxide was bubbled at 130° C. When the reaction pressure became 0 kg/cm$^2$, the reaction system was cooled to 80° C. and 14 parts of potassium hydroxide was added. The system was then decompressed to 7 mmHg at 120° C. Then, a mixture of 2112 parts of ethylene oxide and 907 parts of propylene oxide was bubbled into the reaction system at 120° C. in such a manner that the reaction pressure would not exceed 3 kg/cm$^2$. When the reaction pressure became 0 kg/cm$^2$, 800 parts of ethylene oxide was bubbled at 120° C. in such a manner that the reaction pressure would not exceed 1 kg/cm$^2$. When the reaction pressure became 0 kg/cm$^2$, the reaction mixture was cooled to 80° C. and withdrawn from the autoclave. The reaction product was neutralized and dehydrated in the same manner as Example 1.

The resulting polyether polyol had a hydroxy value of 28 mg KOH/g and a viscosity of 2100 cps at 25° C. The proportion of primary hydroxy groups among all the hydroxy groups as determined by NMR was 98%.

In the above polyether polyol, $l=25$, $m=7.8$, $p=9.1$, $q=2$, and the ethylene oxide content calculated by means of equation (1) was 0.77. Its solidification temperature was 15° C.

COMPARATIVE EXAMPLE 1

As in Example 1, an autoclave was charged with 76 parts of propylene glycol and 13.5 parts of potassium hydroxide and the charge was dehydrated by decompression. Then, 881 parts of propylene oxide was bubbled for reaction. After completion of the reaction, 3543 parts of ethylene oxide was bubbled into the reaction mixture. The resulting reaction product was neutralized and dehydrated as in Example 1 to give a polyether polyol.

This polyether polyol had a hydroxy value of 24.8 mg KOH/g but was solid at 25° C. The proportion of primary hydroxy groups among all the hydroxy groups as determined by NMR was 100%.

In this polyether polyol, l=0, m=7.6, p=40.2 and q=2. The solidification temperature of this polyether polyol was 37° C.

COMPARATIVE EXAMPLE 2

As in Example 1, an autoclave was charged with 76 parts of propylene glycol and 13.5 parts of potassium hydroxide and dehydrated by decompression. Then, a mixture of 881 parts of propylene oxide and 3543 parts of ethylene oxide was bubbled into the reaction system. The reaction product was neutralized and dehydrated as in Example 1 to give a polyether polyol.

This polyether polyol had a hydroxy value of 25.2 mg KOH/g and a viscosity of 1650 cps at 25° C. The proportion of primary hydroxy groups among all the hydroxy groups as determined by NMR was 20%.

In this polyether polyol, l=40.2, m=7.6, p= 0, and q=2. Its solidification temperature was 15° C.

The resulting polyether polyol had a hydroxy value of 37.5 mg KOH/g and a viscosity of 3100 cps at 25° C. The proportion of primary hydroxy groups among all the hydroxy groups as determined by NMR was 85%.

In this polyether polyol, l=17.5, m=6.3, p=7.6, q=6, and the ethylene oxide content determined by equation (1) was 0.75. Its solidification temperature was 10° C.

EXAMPLES 5 AND 6, AND COMPARATIVE EXAMPLES 4 TO 6

Each of the polyether polyols obtained in Examples 1 and 3 and Comparative Examples 1 and 2 and a polyethylene glycol with a molecular weight of 4500 was reacted with TDI-80 at 120° C. for 2.5 hours and the free NCO content, free TDI content and viscosity of each water-curable polyurethane prepolymer thus obtained were determined. The results are set forth in Table 1. The free NCO content and free TDI content were determined by the method of JIS K 7301.

TABLE 1

|  |  | Example 5 | Example 6 | Comparative Example 4 | Comparative Example 5 | Comparative Example 6 |
|---|---|---|---|---|---|---|
| Polyether polyol | Polyol of Example 1 | 648 | — | — | — | — |
|  | Polyol of Example 3 | — | 935 | — | — | — |
|  | Polyol of Comparative Example 1 | — | — | 648 | — | — |
|  | Polyol of Comparative Example 2 | — | — | — | 648 | — |
|  | Polyethylene glycol (mol. wt. = 4500) | — | — | — | — | 648 |
| TDI-80 (parts) |  | 52 | 65 | 52 | 52 | 52 |
| Poly- urethane pre- polymer | Free NCO | 1.80 | 1.57 | 1.85 | 2.05 | 1.91 |
|  | Free TDI | 0.56 | 0.48 | 0.65 | 1.55 | 0.91 |
|  | Viscosity (cp/25° C.) | 5300 | 6100 | Solid | 6100 | Solid |

COMPARATIVE EXAMPLE 3

An autoclave was charged with 91 parts of sorbitol and 27 parts of potassium hydroxide and decompressed to 7 mmHg at 120° C. Then, a mixture of 2307 parts of ethylene oxide and 1102 parts of propylene oxide was bubbled at 120° C. in such a manner that the reaction pressure would not exceed 3 kg/cm². When the pressure became 0 kg/cm², 1000 parts of ethylene oxide was bubbled at 130° C. in such a manner that the reaction pressure would not exceed 1 kg/cm². When the pressure became 0 kg/cm², the reaction product was withdrawn from the autoclave. To 4500 parts of this reaction product was added 4500 parts of water and the mixture was neutralized with an ion exchange resin and dehydrated.

EXAMPLES 7 TO 12 AND COMPARATIVE EXAMPLES 7 TO 9

Each of the polyether polyols obtained in Examples 1, 3 and 4 and Comparative Examples 1 through 3 was reacted with TDI-80, MDI or cr-MDI at 120° C. for 2.5 hours and the free NCO content and viscosity (25° C.) of the resulting water-curable prepolymer were determined.

Then, the condition of the cured product obtained by mixing each of the water-curable prepolymers with water in a ratio of 1:1 by weight and the degrees of adhesion of the prepolymer to moist wood and wet mortar were evaluated. The results are set forth in Table 2.

TABLE 2

|  |  | Example 7 | Example 8 | Example 9 | Example 10 | Example 11 |
|---|---|---|---|---|---|---|
| Polyether polyol (parts) | Polyol of Example 1 | 883 | 750 | 639 | — | — |
|  | Polyol of Example 3 | — | — | — | 886 | 697 |
|  | Polyol of Example 4 | — | — | — | — | — |
|  | Polyol of Comparative Example 1 | — | — | — | — | — |
|  | Polyol of Comparative Example 2 | — | — | — | — | — |
|  | Polyol of Comparative Example 3 | — | — | — | — | — |
| Polyiso- cyanate | TDI-80 | 117 | — | — | 114 | — |
|  | MDI | — | 250 | — | — | 303 |

TABLE 2-continued

| (parts) | cr-MDI | — | — | 361 | — | — |
|---|---|---|---|---|---|---|
| —NCO/—OH | | 3.42 | 6.00 | 9.36 | 3.68 | 8.66 |
| Polyurethane prepolymer | Free NCO (%) | 4.1 | 6.9 | 10.2 | 4.2 | 9.1 |
| | Viscosity (cP/25° C.) | 3700 | 4700 | 11000 | 4200 | 5900 |
| | When mixed with water in a ratio of 1:1 | Easily dispersible, foaming to about twice the initial volume to give a highly elastic foam of fine uniform cells. | Easily dispersible, foaming to about 2.5 times the initial volume to give a highly elastic foam of fine uniform cells. | Easily dispersible, foaming to about 4 times the initial volume to give a highly elastic foam of fine uniform cells. | Easily dispersible, foaming to about twice the initial volume to to give a highly elastic foam of fine uniform cells. | Easily dispersible, foaming to about 4 times the initial volume to to give a highly elastic foam of fine uniform cells. |
| | Adhesion to moist wood and wet mortar | Good | Good | Good | Good | Good |

| | | | Example 12 | Comparative Example 7 | Comparative Example 8 | Comparative Example 9 |
|---|---|---|---|---|---|---|
| Polyether polyol (parts) | | Polyol of Example 1 | 331 | — | — | — |
| | | Polyol of Example 3 | — | — | — | — |
| | | Polyol of Example 4 | 331 | — | — | — |
| | | Polyol of Comparative Example 1 | — | 750 | — | — |
| | | Polyol of Comparative Example 2 | — | — | 750 | — |
| | | Polyol of Comparative Example 3 | — | — | — | 705 |
| Polyisocyanate (parts) | | TDI-80 | — | — | — | — |
| | | MDI | 338 | 250 | 250 | 250 |
| | | cr-MDI | — | — | — | — |
| —NCO/—OH | | | 8.43 | 6.03 | 5.95 | 4.41 |
| Polyurethane prepolymer | Free NCO (%) | | 10.2 | 7.2 | 7.1 | Gelation takes place during synthesis to form a solid mass in the flask. |
| | Viscosity (cP/25° C.) | | 6100 | Solid | 5100 | |
| | When mixed with water in a ratio of 1:1 | | Easily dispersible, foaming to about 4 times the initial volume to give a highly elastic foam of fine uniform cells. | Not dispersible even on warming to 50° C. and adding water. | Easily dispersible, foaming to about 2.5 times the initial volume but the cells of foam are coarse. | — |
| | Adhesion to moist wood and wet mortar | | Good | — | Fair | — |

EXAMPLES 13 AND 14 AND COMPARATIVE EXAMPLES 10 TO 12

Water-curable prepolymer compositions were prepared by blending 75 parts each of the water-curable polyurethane prepolymers obtained in Examples 5 and 6 and Comparative Examples 4 to 6 with 25 parts of cr-MDI. The condition of the cured products obtained by mixing each composition with water in ratios of 1:1 and 95:5 (by weight) was evaluated. The results are set forth in Table 3.

TABLE 3

| | Example 13 | Example 14 | Comparative Example 10 | Comparative Example 11 | Comparative Example 12 |
|---|---|---|---|---|---|
| Water-curable polyurethane prepolymer | Prepolymer of Example 5 | Prepolymer of Example 6 | Prepolymer of Comparative Example 4 | Prepolymer of Comparative Example 5 | Prepolymer of Comparative Example 6 |
| When the composition is mixed with water in a ratio of 1:1 | A foam of fine cells measuring about 0.1 mm in diameter | A foam of fine cells measuring about 0.1 mm in diameter | Warmed to 50° C. and mixed; a foam of coarse cells measuring about 1 mm in diameter | A foam of coarse cells measuring about 1–2 mm in diameter | Warmed to 60° C. and mixed; a foam of coarse cells measuring about 1–2 mm in diameter |
| When the composition is mixed with water in a | Easily dispersible and giving a soft gel after 15 minutes | Easily dispersible and giving a soft gel after 12 minutes | Warmed to 50° C. and mixed but not dispersed; local gels are fomed | Rather easily dispersible and giving a soft gel after 15 | Warmed to 60° C. and mixed; a somewhat brittle gel is formed |

TABLE 3-continued

| | Example 13 | Example 14 | Comparative Example 10 | Comparative Example 11 | Comparative Example 12 |
|---|---|---|---|---|---|
| ratio of 95:5 | | | | minutes | |

What is claimed is:

1. A water-curable polyurethane prepolymer obtained by reacting a polyether polyol with an excess of a polyisocyanate compound containing at least 2 isocyanato groups within its molecule, the polyether polyol being obtained by subjecting an active hydrogen compound containing 2 to 3 active hydrogen atoms within its molecule to random addition polymerization reaction with ethylene oxide and alkylene oxide of 3 to 4 carbon atoms, the ethylene oxide is 50 to 90% by weight of the total weight of ethylene oxide plus alkylene oxide and the polyether polyol is terminated with at least 5 moles of ethylene oxide per active hydrogen atom of the polyol.

2. The water-curable polyurethane prepolymer of claim 1 wherein said polyisocyanate compound is at least one member selected from the group consisting of tolylene diisocyanate, diphenylmethane diisocyanate, crude diphenylmethane diisocyanate, xylylene diisocyanate, hexamethylene diisocyanate, isophorone diisocyanate, and hydrogenated diphenylmethane diisocyanate.

3. A water-curable polyurethane prepolymer composition which is a mixture of a water-curable polyurethane prepolymer of claim 1, with a polyisocyanate compound containing 2 or more isocyanato groups within its molecule.

4. The water-curable polyurethane prepolymer composition of claim 1 wherein said polyisocyanate compound is at least one member selected from the group consisting of tolylene diisocyanate, diphenylmethane diisocyanate, crude diphenylmethane diisocyanate, xylylene diisocyanate, hexamethylene diisocyanate, isophorone diisocyanate, and hydrogenated diphenylmethane diisocyanate.

* * * * *